Patented Nov. 10, 1953

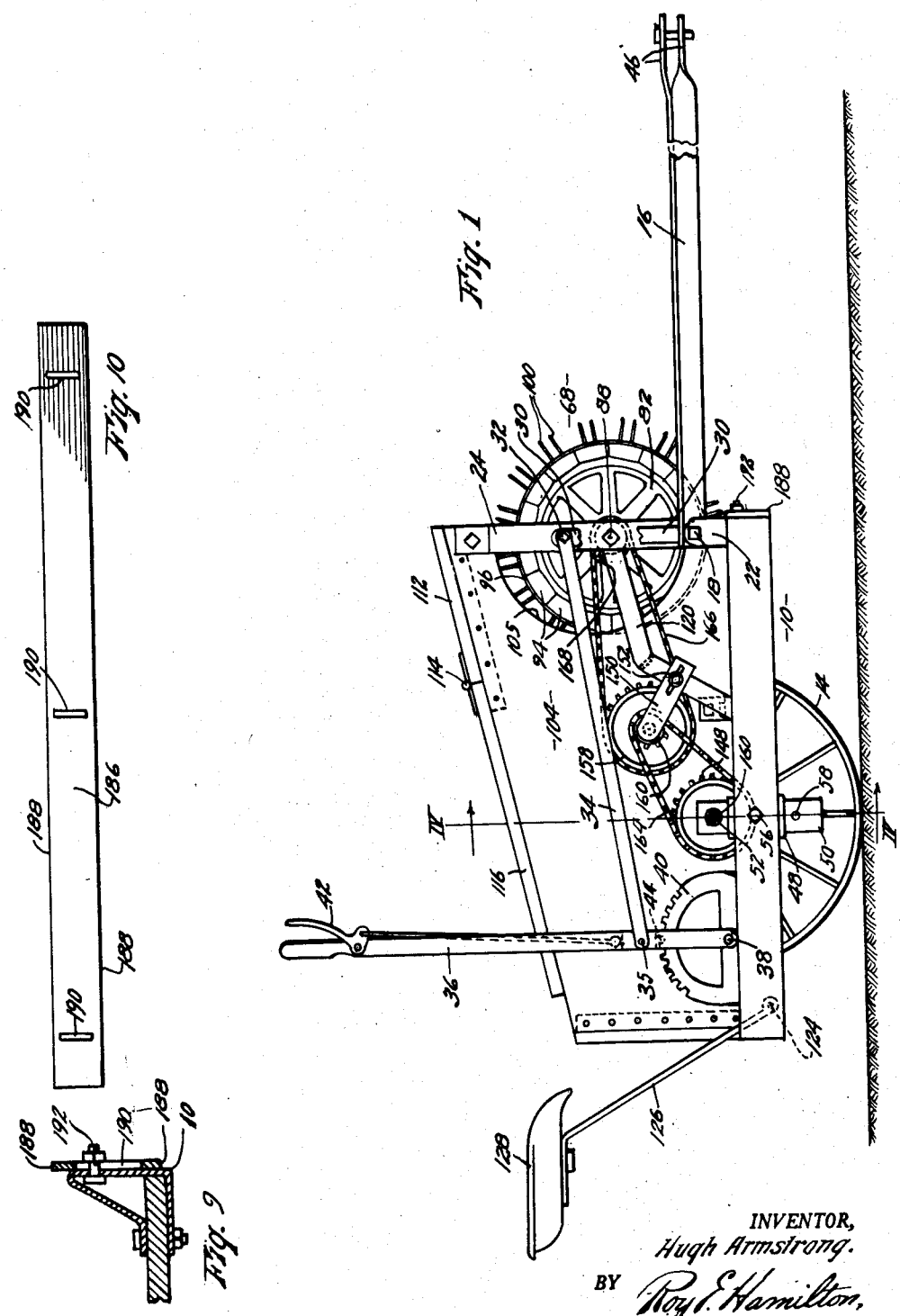

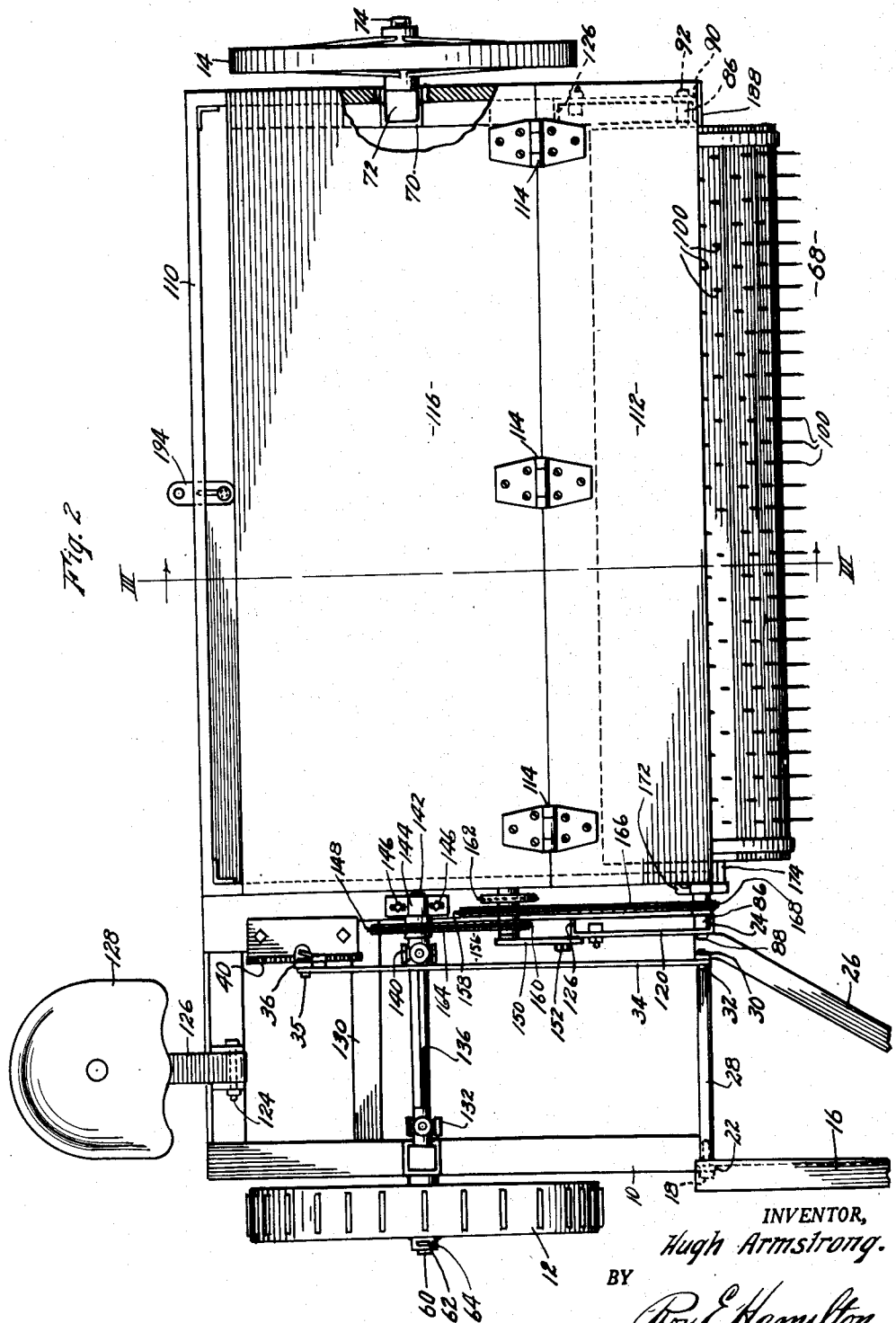

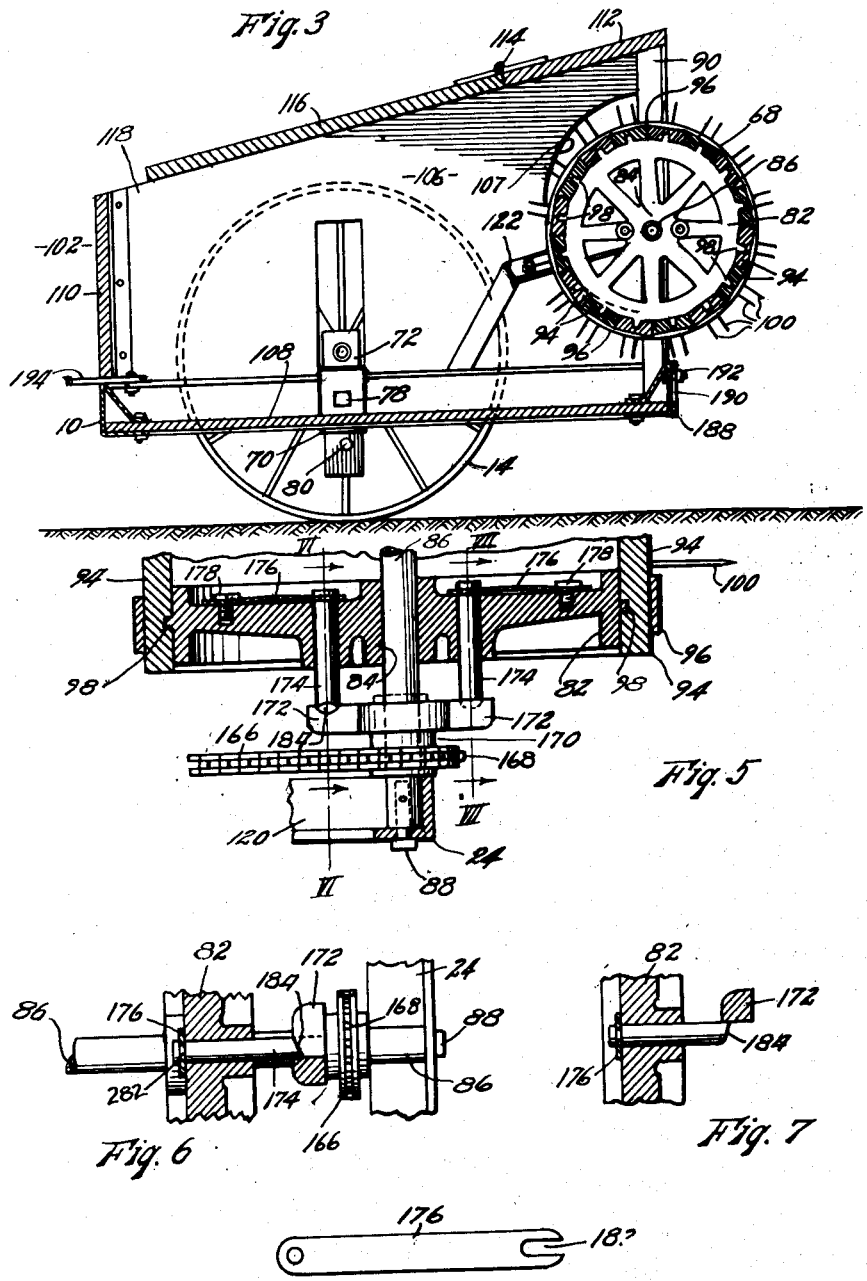

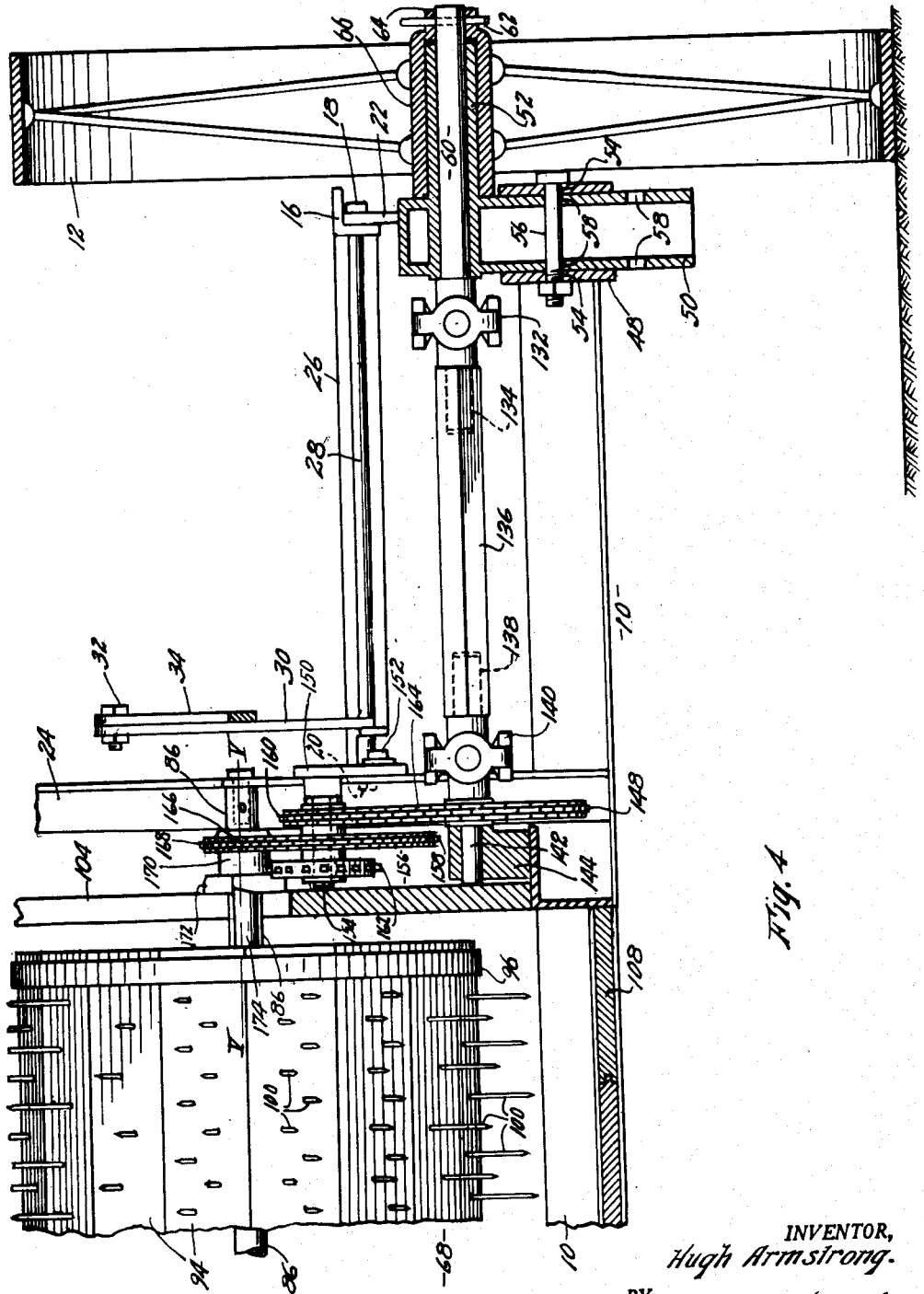

2,658,321

UNITED STATES PATENT OFFICE 2,658,321

GRASS SEED HARVESTER

Hugh Armstrong, Maryville, Mo., assignor to Armstrong-Carson Manufacturing Company, Maryville, Mo., a corporation of Missouri Application October 3, 1949, Serial No. 119,353

1 Claim. (Cl. 56—126)

This invention relates to improvements in seed harvesters and particularly to a seed harvester wherein a stripper cylinder is rotated in conjunction with a stripper bar whereby seed is stripped from grass and delivered to a seed box.

Due to the fact that the plants from which various seeds are harvested are of different heights and require adjustment of the stripper bar and cylinder from the ground level, this harvester has been designed to provide vertical adjusting means whereby the seed receiving box may be maintained substantially horizontal during the various vertical adjustments of the stripper bar above the ground level.

Another object of the present invention is the provision of a seed harvester having a stripper cylinder cooperating with a stripper bar that is mounted for vertical adjustment relative thereto.

A further object is the provision of a seed harvester having a stripper cylinder so mounted in the frame that it can be easily and quickly adjusted to and from a position within the seed box.

Another object is the provision of an unusual drive connection between the bull wheel drive and the stripper cylinder whereby relative adjustment between these parts may be had for stripping grasses of different heights.

Other objects are simplicity and economy of construction, ease and efficiency of operation, and adaptability for harvesting seed from a wide range of various types of seed plants.

With these objects in view as well as other objects which will appear during the course of the specification, reference will be had to the drawings wherein Fig. 1 is an end view of a seed harvester with parts broken away, embodying this invention.

Fig. 2 is an enlarged plan view of the harvester shown in Fig. 1 with parts broken away.

Fig. 3 is a cross sectional view taken on line III—III of Fig. 2.

Fig. 4 is an enlarged sectional view taken on line IV—IV of Fig. 1.

Fig. 5 is an enlarged sectional view taken on line V—V of Fig. 4 with parts left in elevation.

Fig. 6 is a sectional view taken on line VI—VI of Fig. 5.

Fig. 7 is a sectional view taken on line VII—VII of Fig. 5.

Fig. 8 is a detached enlarged elevational view of one of the clutch operating springs.

Fig. 9 is an enlarged sectional view showing the attachment of the stripper bar to the frame.

Fig. 10 is a detached elevational view of the stripper bar.

Throughout the several views like reference characters refer to similar parts and the numeral 10 designates a main frame mounted on a bull wheel 12 and a grain wheel 14 which are disposed in axial alignment to carry the frame in a substantially horizontal position. A tongue 16 is pivoted to the front side of frame 10 adjacent the bull wheel 12 by means of pins 18 and 20 which are respectively positioned for rotation in vertical standards 22 and 24 which are rigidly fixed to frame 10. It will be noted that tongue 16 is provided with a side brace member 26 which is joined to the tongue proper by a tube 28. It is in the opposite ends of this tube that pins 18 and 20 are respectively mounted for convenient removal to remove the tongue for shipping. Rigidly secured to tube 28 is a vertically disposed arm 30 pivoted at its upper end by bolt 32 to a crossbar 34, which is pivoted at its opposite end at 35 to a hand-operated lever arm 36, which in turn is pivoted at 38 to a toothed segment 40. Lever arm 36 is manually adjustable along toothed segment 40 by engaging hand grip 42 to lift latch member 44 from the toothed segment 40 and positioning it in the desired notch to adjust the tongue 16 relative to the frame 10. Due to the fact that the outer end 46 of tongue 16 is hitched to a tractor or another seed harvester, the adjustment of the tongue relative to the frame as just described will adjust the height of the front side of the frame relative to the ground for harvesting seed from grasses or grain of different heights.

Another means for adjusting frame 10 relative to the ground is provided for by the following means for adjusting the wheel axles relative to the frame. A vertically disposed tubular member 48 is rigidly secured to frame 10 to slidably receive the standard 50 carrying the bull wheel axle 52. Member 48 is provided with aligned openings 54 to receive bolts 56 which also pass through one set of holes 58 passing through the side-walls of standard 50. By dropping the frame down so that the bolt 56 will pass through the lower set of holes 58 the harvesting height will be lowered.

For raising the harvester for harvesting higher positioned grass seed, the position of the standard 50 in the tube 48 can be reversed with the bull wheel axle 52 below frame 10; furthermore with the bolt positioned in the lower set of holes 58, the harvester may be raised still higher.

The bull wheel's axle is hollow to receive a drive shaft 60 therethrough. The outer end of shaft 60 is fastened by a pin 62 to the reduced end portion 64 of the bull wheel hub 66, whereby as the harvester is drawn over the field the driveshaft 60 will be rotated to drive the stripper cylinder 68.

The grain wheel 14 is also adjustable relative to frame 10, in a manner similar to the adjustment of the bull wheel 12. This adjustability is provided for by the following means: A vertically disposed tubular member 70 rigidly secured to the end of frame 10 is adapted to slidably receive standard 72 carrying grain wheel axle 74. Member 70 is provided with aligned sets of holes 80 to receive bolt 78 which also passes through one set of holes 80 passing through the walls of standard 72. By dropping the frame down so that the bolt 78 will pass through the lower set of holes 80 the harvesting height will be lowered. Likewise the standard 72 may be vertically reversed so as to provide for the harvesting of high grass.

The stripper cylinder 68 comprises a pair of spaced-apart wheels 82 having hubs 84 in which is rigidly secured the hollow axle 86. One end of axle 86 is secured for rotation by pin 88 in standard 24 and the other end of the axle is secured for rotation in corner post 90 by pin 92. Mounted on the periphery of wheels 82 is a series of longitudinal slats 94 which are disposed in parallel relation with axle 86 and are secured to the respective wheels by means of bands 96 which tightly grip the slats 94 to hold them in position on lugs 98 which are integral with wheels 82. Each slat is provided with a series of spaced-apart radially extending spikes 100, which as the cylinder is rapidly rotated serve to strip the seed from the grass or grain and deliver it to a seed box 102 carried by frame 10. This seed box is provided with an end-wall 104, spaced inwardly from the bull wheel, an end-wall 106 positioned adjacent the grain wheel 14, a bottom member 108, a rear-wall 110, and a top 112. Hinged at 114 to top 112 is a rearwardly extending cover 116, the rear edge of which is spaced apart from rear-wall 110 to present an air vent 118 therebetween. It will be noted that when the stripper cylinder is in the operative position on pins 88 and 92 the periphery thereof will extend forwardly beyond the open front side of box 102 to engage the materials to be harvested. When the harvester is not in use the stripper cylinder is positioned entirely within box 102 for its protection and to guard against accidental injury to persons due to the extended sharp teeth of the cylinder. The means for supporting the cylinder in the box comprises inwardly and downwardly inclined angle or channel irons 120 and 122, disposed in planar alignment with the faces of standard 24 and corner post 90 respectively so that when pins 88 and 92 are removed the cylinder will roll on shaft 86 into the box 102 to rest against abutment 126 where it will be positioned entirely within said box. Gravity will prevent the cylinder from moving outwardly through the front-wall opening. Also the shaft 86, at its opposite ends, might be anchored to the respective angle irons by means of stop-bolts (not shown) to more securely hold the parts in fixed relative relation.

The end-walls 104 and 106 are respectively notched at 105 and 107 to facilitate convenient adjustment of the parts.

Pivotally mounted on frame 10 at 124 is a spring seat bar 126 which carries a seat 128 which normally extends rearwardly of the frame 10 intermediate seed box 102 and bull wheel 12. When the seat is not in use it can be pivoted forwardly to a position between the bull wheel and the seed box. A foot rest 130 is rigidly carried by frame 10 in a position convenient to seat 128.

The stripper cylinder 68 is driven by the bull wheel 12 as the harvester is pulled across the field by any suitable means. As stated above shaft 60 is pinned to the hub of wheel 12 to rotate therewith and is provided at its inner end with a universal coupling 132 having a squared slip joint member 134 slidably mounted in squared coupling tube 136. The opposite end of tube 136 receives the slip joint connection 138 of universal joint 140, which in turn is fixed to shaft 142 mounted for rotation in bearing 144 adjustably fixed by bolts 146 to frame 10. Fixed to shaft 142 intermediate bearing 144 and universal joint 140 is a sprocket wheel 148. A bracket 150 adjustably mounted on the channel iron 120 by means of set screw 152 carries a perpendicularly disposed stub shaft 154 which is disposed in parallel relation with shaft 142. Mounted on shaft 154 is a plurality of integral sprocket wheels 156 comprising a relatively large central sprocket 158, a relatively small sprocket 160 at one side of sprocket 158 and an intermediate size sprocket 162 at the other side of said sprocket 158. These sprockets are equally spaced axially. As shown in the drawing sprocket wheel 148 is in operative alignment with sprocket wheel 160 and are interconnected by sprocket chain 164 so that as wheel 148 is rotated the sprocket wheels 158, 160 and 162 will be rotated at like speeds. Interconnected with sprocket 158 by means of chain 166 is a relatively small sprocket wheel 168 which is freely mounted on shaft 86 adjacent standard 24. The sprocket wheels are so arranged that when the harvester is pulled forwardly the peripheral speed of stripper cylinder will be greater than the peripheral speed of the bull wheel. To reduce the speed of rotation of the stripper cylinder the sprocket wheels 156 may be reversed on stub shaft 154 so that sprocket 162 will be in alignment with sprocket 148 to lower the relative speeds of the stripper cylinder and the bull wheel.

The stripper cylinder 68 is driven by the following overriding clutch drive: Mounted on the hub 170 of sprocket wheel 168 is a pair of diametrically-opposed radial arms 172 designed to be engaged and driven by drive pins 174 which are slidably mounted in hubs 84 for reciprocation in parallel relation with shaft 86. These drive pins 174 are constantly urged to their normal extended position shown in Figs. 5, 6 and 7 by flat springs 176 which are secured at one of their ends by screws 178 to wheel 82. This spring is slotted at its other end at 182 to engage in annular groove 282 formed in the end portion of pin 174, to firmly engage the pin and prevent relative rotation thereof. The outer ends are cut diagonally to present an inclined surface 184. This inclined surface is so positioned relative to the radial arms 172 that when the arms are rotated clockwise when viewed in the direction shown in Fig. 3 the arms 172 will engage the extended portion of pins 174 to drive the cylinder in a clockwise direction. Should the speed of cylinder 68 exceed the speed of the drivers 174 the cylinder will override the drivers by engaging the inclined surfaces 184 of the pins 174 to retract the pin and compress springs 176. This overriding action of stripper cylinder is important in that it prevents undue shock to the working parts. It will be noted that the universal connections between drive shaft 60 and shaft 142 is such that relative positions of the shafts due to the relative vertical adjustment of the frame above the ground is provided for and that a proper driving relation of the parts is always maintained.

The stripper bar best shown in Figs. 9 and 10 comprises an elongated bar 186 having straight edges 188 so that it can be reversed edge for edge or end for end and having transverse slots 190. A bolt 192 mounted in frame 10 passes through slot 190 so that when the nut is set the bar will be secured in the desired position relative to the frame. Also as the bar is raised it will increase the capacity of the seed box.

When the harvesters are used in tandem a hitch bar 194 anchored to the rear portion of frame 10 is used to engage the tongue of the following harvester. Several of the harvesters may be joined together and drawn by a single tractor.

What I claim as new and desire to protect by Letters Patent is:

A seed harvester comprising a frame, carried by a pair of substantially axially disposed wheels, a seed box having an open front carried by said frame, means for vertical adjustment of said frame on said wheels, a seed stripping cylinder having an axle mounted for rotation on said frame in the open front of said seed box, downwardly and rearwardly inclined runways carried by said frame and adapted to receive the end portion of the cylinder axle whereby the cylinder may be positioned entirely within said seed box, means releasably securing said axle at the forward ends of said runways, a stripper bar fixed to said frame in operative relation below said stripper cylinder, and means interconnecting one of said wheels with said stripper cylinder whereby the stripper cylinder will be rotated as said harvester is drawn forwardly over a field.

HUGH ARMSTRONG.

References Cited in the file of this patent

UNITED STATES PATENTS

| Number | Name | Date |
|---|---|---|
| 32,416 | Decker | May 28, 1861 |
| 515,802 | Storey | Mar. 6, 1894 |
| 637,281 | Pence | Nov. 21, 1899 |
| 789,233 | Rand | May 9, 1905 |
| 897,844 | Nettleship | Sept. 1, 1908 |
| 1,600,877 | Hardin | Sept. 21, 1926 |
| 1,668,064 | Freund | May 1, 1928 |
| 1,735,104 | Bebensee | Nov. 12, 1929 |
| 2,204,115 | Armstrong | June 11, 1940 |
| 2,412,002 | Nelson et al. | Dec. 3, 1946 |